(12) United States Patent
Asako et al.

(10) Patent No.: US 6,837,919 B2
(45) Date of Patent: Jan. 4, 2005

(54) METHOD FOR DEAERATING ELECTRORHEOLOGICAL FLUID IN A CLOSED DEVICE

(75) Inventors: Yoshinobu Asako, Tsuchiura (JP); Satoru Ono, Tsuchiura (JP); Kazutoshi Ito, Komaki (JP); Eiji Uematu, Nagoya (JP)

(73) Assignees: Nippon Shokubai Co., Ltd., Osaka (JP); CKD Corporation, Komaki (JP)

( * ) Notice: Subject to any disclaimer, the term of this patent is extended or adjusted under 35 U.S.C. 154(b) by 277 days.

(21) Appl. No.: 10/259,329

(22) Filed: Sep. 30, 2002

(65) Prior Publication Data

US 2003/0024392 A1 Feb. 6, 2003

Related U.S. Application Data

(62) Division of application No. 08/237,907, filed on May 4, 1994, now abandoned.

(51) Int. Cl.[7] .............................................. B01D 19/00
(52) U.S. Cl. ............................. 95/266; 95/193; 95/201; 188/267.1; 267/140.14
(58) Field of Search .......................... 95/193, 201, 266; 188/267.1; 267/140.14

(56) References Cited

U.S. PATENT DOCUMENTS 3,969,092 A * 7/1976 Huffman et al. ............... 96/164
4,744,914 A * 5/1988 Filisko et al. .................. 252/74

FOREIGN PATENT DOCUMENTS

| EP | 0 178 078 A1 | 4/1986 |
|---|---|---|
| EP | 0 448 874 A1 | 10/1991 |
| JP | 48-58295 A | 8/1973 |
| JP | 48-58295 | 8/1973 |
| JP | 50-102771 A | 8/1975 |
| JP | 50-102771 | 8/1975 |
| JP | 52-90782 | 7/1977 |
| JP | 52-90782 B | 7/1977 |
| JP | 53-8466 | 1/1978 |
| JP | 53-8466 A | 1/1978 |
| JP | 54-38255 B2 | 11/1979 |
| JP | 61-216202 A | 9/1986 |
| JP | 63-97694 A | 4/1988 |
| JP | 63-120938 A | 5/1988 |
| JP | 63-120938 | 5/1988 |
| JP | 1-236291 A | 9/1989 |
| JP | 1-247835 A | 10/1989 |
| JP | 3-153938 A | 7/1991 |
| JP | 4-224304 A | 8/1992 |

* cited by examiner

Primary Examiner—Fred Teskin
(74) Attorney, Agent, or Firm—Kubovcik & Kubovcik

(57) ABSTRACT

According to the present invention, electrorheological fluid is deaerated after it is sealed in a closed device which is operated by the electrorheological fluid. Thus, it is possible to control the operation of the closed device in accordance with an electric field. Additionally, the control of viscosity is not affected by repetitive operations of the closed device, thereby obtaining a closed device having a smooth operation and good repeatability. The deaeration is achieved under a predetermined reduced pressure, for example, of not more than 100 torr. In addition thereto, a suitable heating process is carried out as required.

5 Claims, 12 Drawing Sheets

METHOD FOR DEAERATING ELECTRORHEOLOGICAL FLUID IN A CLOSED DEVICE

This application is a division of application Ser. No. 08/237,907, filed May 4, 1994 now abandoned, which is a Continued Prosecution Application (CPA) of application Ser. No. 08/237,907, filed May 4, 1994.

FIELD OF THE INVENTION

The present invention relates to closed devices for use with electrorheological fluid, and more precisely relates to a closed device for use with electrorheological fluid which can be adapted to a device such as a clutch, brake, engine mount, damper, valve, shock absorber, and actuator and can be effectively adapted particularly to a closed device among them.

BACKGROUND OF THE INVENTION

An electrorheological fluid is known as a fluid: (1) which is obtained, for example, by dispersing dispersed phase particles in an insulating dispersion medium; (2) whose character of viscosity changes from Newtonian viscosity to Bingham viscosity in accordance with an applied electric field; and (3) which generally shows a so-called Winslow's effect wherein the viscosity remarkably increases in response to the externally applied electric field so as to induce great shear stress. Since the Winslow's effect has a prompt response, the electrorheological fluid having this effect has been adapted to (A) a variety of driving devices such as a clutch, brake, engine mount, damper, valve, shock absorber, and actuator and (B) an ink jet of the electrorheological fluid.

It is known that an electrorheological fluid is obtained by dispersing cellulose, starch, silica gel, ion exchange resin, and sulfonated polymer particles possessing aromatic rings substituted with sulfonic acid groups, etc. in an insulating dispersion medium such as silicone oil, diphenyl chloride, or transformer oil. Moreover, the following fluids have recently been proposed: (1) a fluid wherein organic semiconductor particles such as poly(acene-quinone) are adopted as the dispersion phase (see the Japanese unexamined patent publication No. 61-216202/1986); (2) a fluid wherein dielectric substance particles are adopted as the dispersion phase, the dielectric substance having a three-layered structure wherein an electric conductive thin layer is provided on an organic solid particle and an insulating thin layer is further provided on the electric conductive thin layer (see Japanese unexamined patent publication No. 63-97694/1988); and (3) a fluid wherein a powder of an electric conductive composition is adopted as the dispersion phase, the electrically conductive composition being obtained by dispersing electric conductor particles such as carbon black in a resin (see Japanese unexamined patent publication No. 1-236291/1989).

The inventors of the present invention studied conventional closed devices for use with electrorheological fluids for the purpose of their practical use, and found the following problems. More specifically, in the conventional closed devices for use with electrorheological fluids, since an electrorheological fluid which is sealed inside the closed device contains some dissolved gases or bubbles, (1) a discharge occurs during operation of the closed device, thereby causing deterioration of the electrorheological fluid, and (2) the electrorheological fluid does not effectively operate in response to an applied electric field, thereby interrupting smooth operation of the closed device. Additionally, when the closed device is repeatedly operated, it sometimes occurs that the closed device is not well operated with repeatability, thereby further presenting the problem that the characteristics of the closed device deteriorate.

SUMMARY OF THE INVENTION

Accordingly, an object of the present invention is to meet the foregoing problems presented by the conventional arts, i.e., it is an object of the present invention to smoothly operate a closed device with repeatability and to avoid deterioration of the characteristics of the closed device even when it is repeatedly operated.

The inventors of the present invention found that the foregoing object is achieved when that the electrorheological fluid is deaerated after it is sealed inside the closed device, thereby causing the inventors to arrive at the present invention.

The present invention relates to a closed device for use with an electrorheological fluid which is characterized in that the electrorheological fluid is deaerated after it is sealed inside the closed device which is operated by the electrorheological fluid.

The deaeration of the present invention indicates the state wherein, in the closed device which is operated by the electrorheological fluid, substantially no dissolved gases and bubbles are contained in the electrorheological fluid. The deaeration is achieved, for example, by leaving the electrorheological fluid under reduced pressure, or by removing the dissolved gases and bubbles in accordance with stirring or vibration.

It is necessary in the present invention that the electrorheological fluid is deaerated after it is sealed inside the closed device. Even if an electrorheological fluid which has not been deaerated is sealed such that no bubbles are contained in the closed device, the following problems occur. More specifically, gaseous materials which are adsorbed by the surface of the dispersed phase particle and/or are dissolved in the dispersion medium come together so as to form bubbles during the operation of the closed device. As a result, a partial discharge occurs during operation of the closed device, thereby causing deterioration of the electrorheological fluid, and the electrorheological fluid does not effectively operate in response to an applied electric field, thereby interrupting the smooth operation of the closed device. Even if an electrorheological fluid which was deaerated is used, when the deaeration is not achieved with respect to the electrorheological fluid during and/or after the time when the electrorheological fluid is injected into the closed device, the electrorheological fluid absorbs gaseous materials during the injection, thereby resulting in that the deaeration state can not be maintained. Thus, the same problems as the foregoing ones occur.

There is no restriction on the closed device for use with an electrorheological fluid of the present invention provided that the closed device can be well operated by the electrorheological fluid. The closed device mentioned here indicates one which has a structure wherein no outside air can contact the electrorheological fluid sealed inside the closed device and which can convert electric input into mechanical output by use of the electrorheological fluid.

The present closed device can be adapted to (1) an electrodes fixed-type device such as a speed control apparatus of a driving-type cylinder as shown in FIG. 11 (see, for example, Japanese unexamined patent publication No. 4-224204/1992) in which an electrorheological fluid is movable in a container means so that no outside air can contact the electrorheological fluid and the electrodes as means for applying an electric field to the electrorheological fluid are fixed on the container means, and may be adapted to (2) an electrodes movable-type device such as a clutch (see, for example, Japanese examined patent publication No. 54-38255/1979) in which an electrorheological fluid is sealed in a container so that no outside air can contact the electrorheological fluid and the device is operated by moving the electrode sections which function as means for applying an electric field to the electrorheological fluid. Other closed devices for use with the electrorheological fluid of the present invention include the following apparatuses: a cushioning apparatus (see, for example, Japanese unexamined patent publication No. 3-153938/1991); a shock absorber (see, for example, Japanese patent Publication No. 1-247835/1989); a brake (see, for example, Japanese patent Publication No. 52-90782/1977); a damper (see, for example, Japanese patent Publication No. 52-90782/1977); a vibration proofing apparatus (see, for example, Japanese patent Publication No. 63-120938/1988).

The following are concrete examples for deaeration: ① a method comprising the steps of injecting an electrorheological fluid into a closed device; carrying out the deaeration of the injected electrorheological fluid under reduced pressure; and thereafter sealing the closed device, ② a method comprising the steps of reducing the pressure inside the closed device; injecting the electrorheological fluid; and thereafter sealing the closed device, and ③ a method wherein the deaeration of electrorheological fluid is carried out during and/or after the time when the electrorheological fluid is prepared by mixing dispersed phase particles with an insulating dispersion medium under reduced pressure. Among these methods, it is preferable that either one of methods ① and ② is alone used. It is more preferable that methods ① and ② are used in combination, and it is most preferable that method ③ and method ① and/or ② are used in combination since the deaeration of the electrorheological fluid is further effectively carried out. However, according to only method ③, it is impossible that the electrorheological fluid is kept deaerated after it is sealed in the closed device. Thus, it is impossible to achieve the present invention in accordance with only method ③.

The deaeration may be carried out under reduced pressure. In such a case, it is preferable to deaerate under a reduced pressure of not more than 100 torr, and is particularly preferable to deaerate under a reduced pressure of not more than 25 torr. Additionally, it may be possible to deaerate while vibrating or stirring the electrorheological fluid itself and/or the closed device. It may also be possible to deaerate while applying heat to the electrorheological fluid itself and/or to the closed device. In such a case, there is no specific restriction on the heating temperature, but it is preferable for practical reasons that the heating temperature falls within a range of 30° C. to 100° C.

The dispersed phase particle for use in the present invention which constitutes the electrorheological fluid indicates a dielectric substance particle which directly relates to the occurrence of the electrorheological effect. The following are examples of the dielectric substance particle: a hydrophilic organic particle such as starch, cellulose, an ion exchange resin, and a sulfonated polymer possessing aromatic rings substituted with sulfonic acid groups; a hydrophilic inorganic particle such as silica, and alumina; a dielectric composite particle such as a particle having a three-layered structure wherein an electric conductive thin layer is provided on an organic solid particle and an insulating thin layer is further provided on the electric conductive thin layer and a particle which is formed so that the surface of an electric conductive particle such as aluminum is coated with a thin insulating layer; an electric conductive composite obtained by dispersing electric conductor particles such as carbon black in a resin; an organic semiconductor particle such as poly(acene-quinone); an inorganic ferroelectric particle such as barium titanate and lithium tartrate.

There is no specific restriction on the insulating dispersion medium for use in the present invention which constitutes the electrorheological fluid provided that the insulating liquid does not dissolve the foregoing dispersed phase particles. The following are examples of the insulating dispersion medium: silicone oil such as polydimethyl siloxane and polyphenyl methylsiloxane; a hydrocarbon such as liquid paraffin, decane, dodecane, methylnaphthalene, dimethylnaphthalene, ethylnaphthalene, biphenyl, decalin, and partially hydrogenated triphenyl; an ether compound such as biphenyl ether; a halogenated hydrocarbon such as chlorobenzene, dichlorobenzene, trichlorobenzene, bromobenzene, dibromobenzene, chloronaphthalene, dichloronaphthalene, bromonaphthalene, chlorobiphenyl, dichlorobiphenyl, trichlorobiphenyl, bromobiphenyl, chlorodiphenylmethane, dichlorodiphenylmethane, trichlorodiphenylmethane, bromodiphenylmethane, chlorodecane, dichlorodecane, trichlorodecane, bromodecane, chlorododecane, dichlorododecane, bromododecane; halogenated diphenyl ether such as chlorodiphenyl ether, dichlorodiphenyl ether, trichlorodiphenyl ether, bromodiphenyl ether; fluoride of an organic compound such as Daifloil and Demnum (both are provided by Daikin Industries Ltd.); and an ester compound such as dioctyl phthalate, trioctyl trimellitate, and dibutyl sebacate. At least one of the foregoing insulating dispersion media may be used in the present invention. Among them, it is preferable to adopt an organic compound containing silicone and/or fluorine elements such as silicone oil and a fluoride of an organic compound, thereby making it easy to deaerate the electrorheological fluid.

The electrorheological fluid of the present invention is easily obtained by dispersing the foregoing dispersed phase particles in the foregoing insulating dispersion medium.

According to the present invention, it is possible to add a variety of additives such as a surface active agent, a high polymer dispersing agent, and a high polymer viscosity enhancing agent to the fluid so as to improve the dispersion of the dispersed phase particles in the dispersion medium, to adjust the viscosity of the electrorheological fluid, or to improve the shearing stress.

Further objects, features, and advantages of the present invention will become apparent from the detailed description given hereinafter. The advantages of the present invention will become more fully understood from the detailed description given hereinbelow and the accompanying drawings which are given by way of illustration only.

DESCRIPTION OF THE EMBODIMENTS

Figure 1:
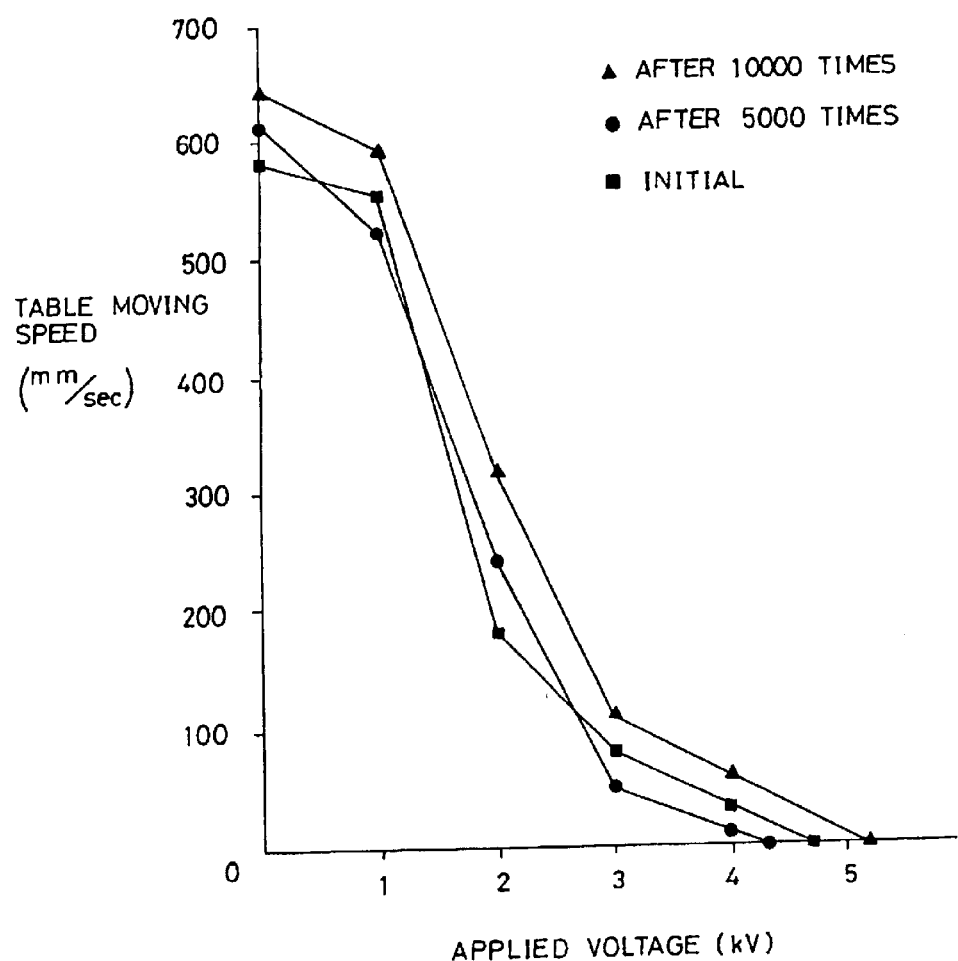
FIG. 1 is a graph showing the applied voltage dependency of the table moving speed of a closed device in accordance with a first embodiment of the present invention.

The following description deals with the embodiments of the present invention in more detail, but the present invention is not restricted by the description.

PREPARATION EXAMPLE 1

A four-neck separable flask of 5 liters, having a stirrer, a reflux condenser and a thermometer, was supplied with 2.4 liters of water, and 32.0 g of Kuraray Poval PVA-205 (i.e., polyvinyl alcohol; provided by Kuraray Co., Ltd.) was added to the flask. After dissolving the Poval in water, a mixture composed of 500 g of styrene, 100 g of industrial divinylbenzene (i.e., a mixture of divinylbenzene of 55 percentage by weight and ethylstyrene of 35 percentage by weight; provided by Wako Pure Chemical Industry Co., Ltd.), and 8 g azobisisobutyronitrile was further added. Thereafter, the content of the flask was dispersed at a stirring speed of 600 rpm, and the polymerization was carried out for 8 hours at 80° C. The resultant solid materials were filtered and fully washed with water, and were dried by a hot air dryer for 12 hours at 80° C., thereby obtaining a spherical crosslinked polymer of 573 g.

A four-neck separable flask of 20 liters, having a stirrer, thermometer, and dripping funnel, was supplied with 500 g of the crosslinked polymer, which is obtained in the foregoing polymerization process. Next, 5 kg of 98 percentage by weight concentrated sulfuric acid was added. After the reactant mixture was heated up to 80° C., a sulfonation reaction was carried out by heating and stirring for 24 hours at 80° C. Thereafter, the reactant mixture was poured into ice water, and then the resultant solid materials were filtered and were washed with water and acetone. The resultant solid materials were neutralized in 2 liters of a 10% aqueous solution of sodium hydroxide. Then, the resultant solid materials were filtered and were fully washed with water. Then, the resultant solid materials were dried by a vacuum dryer for 10 hours at 80° C., thereby obtaining 900 g of dispersed phase particles made of a spherical sulfonated polymer. Adsorption of moisture in the dispersed phase particles was carried out so that the water content became 2 percent by weight.

The dispersion was carried out by dispersing 80 g of the dispersed phase particles in 200 g of Shin-etsu silicone oil KF96-20CS (i.e., dimethylsilicon oil; Shin-etsu Chemical Industry Co., Ltd.) under a reduced pressure of 50 torr for 30 minutes, thereby obtaining an electrorheological fluid 28A.

PREPARATION EXAMPLE 2

The dispersion was carried out by dispersing 80 g of the dispersed phase particles, which were prepared in the same manner as preparation example 1, in 200 g of Shin-etsu silicone oil KF96-20CS under a reduced pressure of 100 torr for 30 minutes while heating up to 50° C., thereby obtaining electrorheological fluid 28B.

PREPARATION EXAMPLE 3

The dispersion was carried out by dispersing 80 g of the dispersed phase particles, which were prepared in the same manner as preparation example 1, in 200 g of Shin-etsu silicone oil KF96-20CS for 30 minutes, thereby obtaining electrorheological fluid 28C.

PREPARATION EXAMPLE 4

The dispersion was carried out by dispersing 80 g of the dispersed phase particles, which were prepared in the same manner as preparation example 1, in 200 g of Shin-etsu silicone oil KF96-20CS under a reduced pressure of 6.6 torr for 30 minutes while heating up to 120° C., thereby obtaining electrorheological fluid 28D.

PREPARATION EXAMPLE 5

The dispersion was carried out by dispersing 80 g of the dispersed phase particles, which were prepared in the same manner as preparation example 1, in 200 g of Therm-S 900 (i.e., partially hydrogenated triphenyl; provided by Nippon Steel Chemical Co., Ltd.) under a reduced pressure of 50 torr for 30 minutes, thereby obtaining electrorheological fluid 28E.

(First Embodiment)

Figure 11:
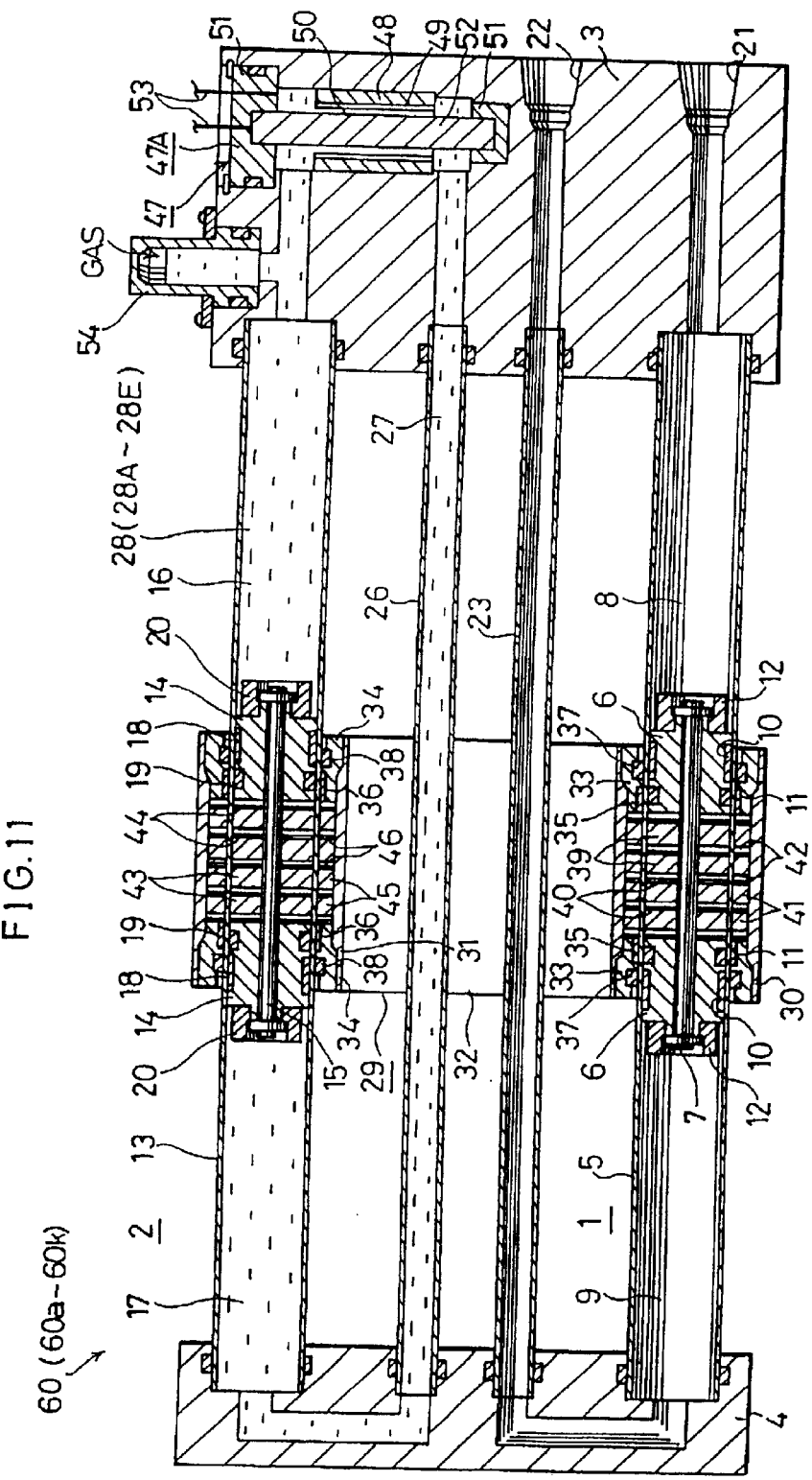
FIG. 11 is a sectional view showing the closed device for use in the comparative examples and the embodiments of the present invention.

The electrorheological fluid 28A, which was prepared in accordance with the foregoing manner, was injected into a closed device 60 as shown in FIG. 11 while a container means was kept under a reduced pressure of 600 torr. After the injection, the electrorheological fluid 28A was deaerated under a reduced pressure of 20 torr for 3 hours, thereafter the electrorheological fluid 28A was sealed inside the closed device.

Figure 12:
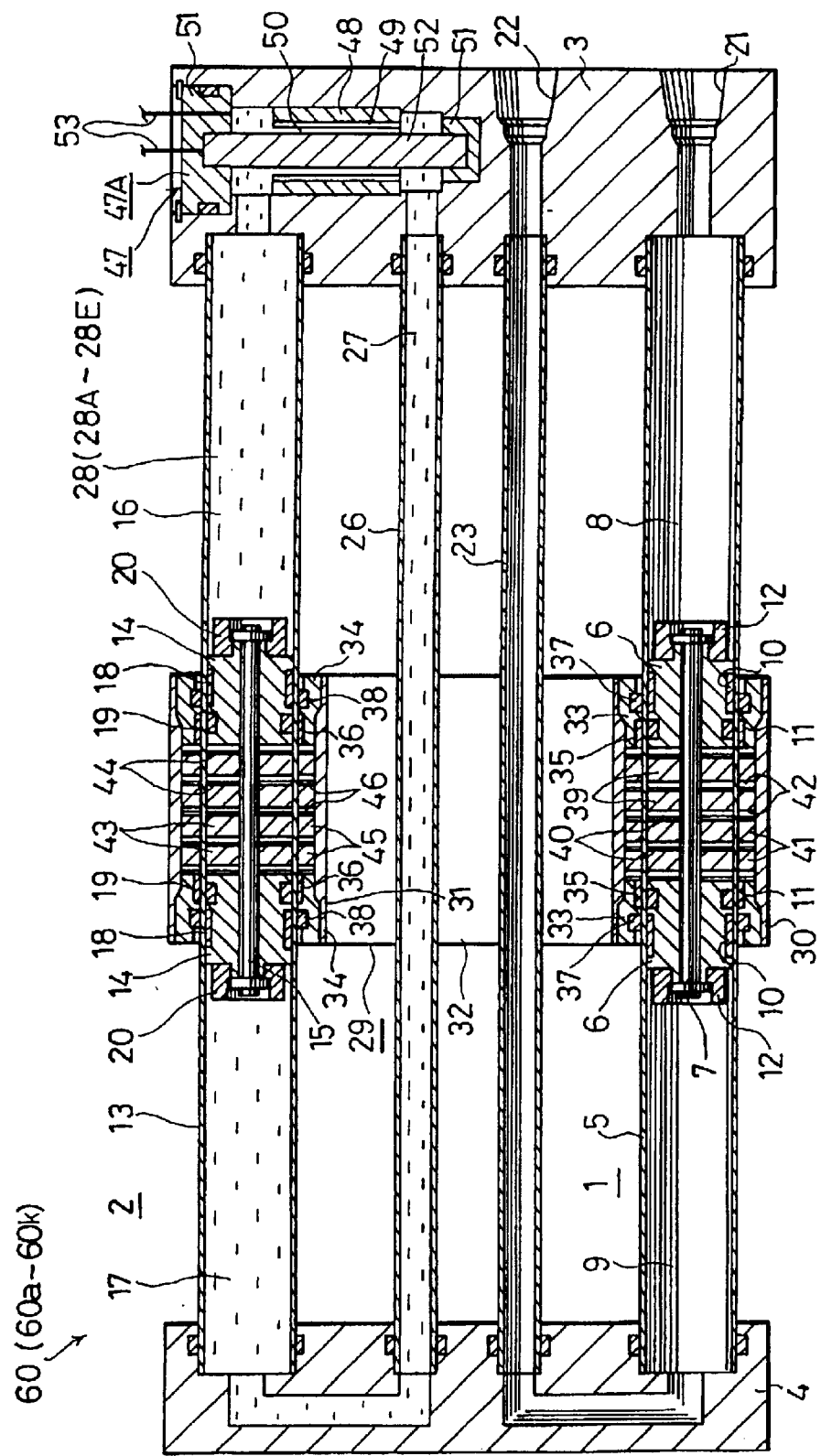
FIG. 12 is a sectional view showing the structure of the main portion of FIG. 11.

The following description deals with the main portion of the closed device 60 with reference to FIG. 12. According to the closed device 60, the moving speed of a table, which was moved by a pneumatic cylinder, was electrically controlled by use of the electrorheological fluid. The closed device 60 was provided with a driving cylinder 1 and a controlling cylinder 2. The respective cylinders 1 and 2 were composed of a rodless cylinder and were arranged between a pair of end blocks 3 and 4 so as to be parallel with each other. The driving cylinder 1 was provided with a cylinder tube 5, a pair of pistons 6 movable in the cylinder tube 5, and a piston rod 7 connecting the two pistons 6. The cylinder tube 5 of the driving cylinder 1 was divided by the piston 6 into a pair of fluid chambers 8 and 9. Each outer periphery of the pistons 6 was provided with a wear ring 10 and a packing 11, and both ends of the piston rod 7 were respectively provided with cushion members 12.

The controlling cylinder 2 was provided with a cylinder tube 13, a pair of pistons 14 movable in the cylinder tube 13, and a piston rod 15 connecting the two pistons 14. The cylinder tube 13 of the controlling cylinder 2 was divided by the piston 14 into a pair of fluid chambers 16 and 17. Each outer periphery of the pistons 14 was provided with a wear ring 18 and a packing 19, and both ends of the piston rod 15 were respectively provided with cushion members 20.

A pair of input ports 21 and 22 were provided with the end block 3. The input port 21 was communicated with the fluid chamber 8 of the driving cylinder 1. A communicating pipe 23 was bridged between the end blocks 3 and 4. The input port 22 communicated with the fluid chamber 9 through the communicating pipe 23. When a,compressive fluid was supplied from a compressor (not shown) to the fluid chamber 8 through the input port 21 in accordance with the switching of a switching valve (not shown), the piston 6 of the driving cylinder 1 moved to the left. In contrast, when the compressive fluid was supplied from the compressor to the fluid chamber 9 through the input port 22 in accordance with the switching of the switching valve, the piston 6 moved to the right.

The communicating pipe 26 was bridged between the end blocks 3 and 4. A communicating path 27 was provided with the communicating pipe 26, and connected the fluid chambers 16 and 17 so as to form a closed circuit. A container means was provided 15 with the communicating path 27, and the fluid chambers 16 and 17 of the controlling cylinder 2. Non-compressive fluid 28 was supplied to the container means, the non-compressive fluid 28 having a characteristic in which the viscosity thereof varied in proportion to an applied electric field.

A connecting device 29 constituting connecting means was provided between the driving cylinder 1 and the controlling cylinder 2 for connecting the piston 6 of the driving cylinder 1 and the piston 14 of the controlling cylinder 2 so as to be coupled with each other. The connecting device 29 was composed of a slider 30 movably provided in the cylinder tube 5 of the driving cylinder 1, a slider 31 movably provided in the cylinder tube 13 of the controlling cylinder 2, and a moving member 32 as a connector which bridged the driving cylinder 1 and the controlling cylinder 2 so as to connect the sliders 30 and 31. A pair of cylindrical members 33 were fitted in the slider 30, while a pair of cylindrical members 34 were fitted in the slider 31. An inner peripheral surface of the cylindrical members 33 was provided with a wear ring 35 and a wiper ring 37, while an inner peripheral surface of the cylindrical members 34 was provided with a wear ring 36 and a wiper ring 38.

A plurality of magnets 39 on the piston side were provided between the pistons 6 of the driving cylinder 1 through a plurality of yokes 40. An inner surface of the slider 30 was provided with a plurality of magnets 41 on the slider side through the yokes 42 so as to face the magnets 39 on the piston side. A plurality of magnets 43 on the piston side were provided between the pistons 14 of the controlling cylinder 2 through a plurality of yokes 44. An inner surface of the slider 31 was provided with a plurality of magnets 45 on the slider side through the yokes 46 so as to face to the magnets 43 on the piston side. When the magnets 39 and 43 on the piston side attracted the magnets 41 and 45 on the slider side, the pistons 6 and 14 of the respective cylinders 1 and 2 were connected so as to be coupled with each other through the sliders 30, 31 and moving members 32.

The end block 3 was provided with a flow-controller 47 for controlling the flow of the non-compressive fluid 28 which was supplied from the communicating path 27 to the fluid chambers 16 and 17 of the controlling cylinder 2, or vice versa. According to the present embodiment, an electric field controlling device 47A was provided as the flow-controller 47 for supplying and adjusting the electric field to the non-compressive fluid 28. The electric field controlling device 47A was composed of a cylindrical electrode 49 which was provided in the communicating path 27 through an insulator 48 and a long cylindrical electrode 52 provided in the communicating path 27 through an insulator 51 so as to be located keeping a predetermined space 50 in the cylindrical electrode 49. With the arrangement, when the voltage applied to the electrodes 49 and 52 through lead wires 53 increased or decreased, the electric field was changed, thereby resulting in the viscosity of the non-compressive fluid 28, which passed through the space 50 between the electrodes 49 and 52, being increased or decreased in proportion to the applied electric field.

The following description deals with the operation of a speed control device of the driving cylinder 1 which was arranged as above-mentioned.

When the compressive fluid was supplied from the compressor to the fluid chamber 8 or 9 through the input port 21 or 22 in accordance with the switching of the switching valve, the piston 6 of the driving cylinder 1 moved to the left or to the right. In response to the movements of the driving cylinder 1 and piston 6, the piston 14 of the controlling cylinder 2 integrally moved to the same direction through the sliders 30, 31 and moving member 32 of the connecting device 29, thereby resulting in that the non-compressive fluid 28 flowed between the fluid chambers 16 and 17 of the controlling cylinder 2.

In such a case, the electric field was changed in response to the increase or decrease of the voltage applied to the electrodes 49 and 52 of the electric field controlling device 47A. The viscosity of the non-compressive fluid 28 which flowed in the space 50 between the electrodes 49 and 52 increased or decreased in proportion to the applied electric field, thereby resulting in the braking force being increased or decreased. More specifically, since the viscosity of the non-compressive fluid 28 became great in response to the increase of the voltage applied to the electrodes 49 and 52, the flow of the non-compressive fluid 28 decreased, thereby resulting in that the braking force of the controlling cylinder 2 became great, so that the driving cylinder 1 moved slowly. In contrast, since the viscosity of the non-compressive fluid 28 became small in response to the decrease of the applied voltage, the flow of the non-compressive fluid 28 increased, thereby resulting in that the braking force of the controlling cylinder 2 became small, so that the driving cylinder 1 moved fast. Accordingly, it was possible to correctly control the speed of the driving cylinder 1 which was operated by the compressive fluid in accordance with the applied electric signal. The small space 50 might make the flow of the non-compressive fluid 28 small so as to obtain a nearly locking state. Note that the electrorheological fluid 28A was used as the non-compressive fluid 28 in the first embodiment.

The sealing of the electrorheological fluid 28A into a closed device 60 was carried out such that the electrorheological fluid 28A used as the non-compressive fluid 28 was injected into the container means of the closed device 60 under a reduced pressure of 600 torr. Thereafter the injected electrorheological fluid 28A was deaerated for 3 hours under a reduced pressure of 20 torr. By use of the closed device

60a wherein the electrorheological fluid 28A was thus sealed, the test was carried out with regard to: (1) the applied voltage dependency of the table moving speed; and (2) the characteristic of the applied voltage dependency after the repeated operations.

The closed device 60 was provided with an air accumulator 54 (for example made of a transparent acrylic resin) by which it was possible to observe the deaeration state of the electrorheological fluid which was sealed inside the closed device (see FIG. 11). In a case where the electrorheological fluid sealed inside the closed device is deaerated, no gaseous material or very small amount of gaseous materials was concentrated in the air accumulator 54 during the repetitive test. In contrast, when the electrorheological fluid sealed inside the closed device is not deaerated, a large amount of gaseous materials was concentrated in the air accumulator 54 during the repetitive test.

The measured results are shown in FIG. 1. As is clear from FIG. 1, it was possible to control the table moving speed in response to the applied voltage having a range of 0 kV to 5 kV over a wide range of about 600 mm/sec to a substantially stopped state. Additionally, after the repetitive tests of 5000 times and 10000 times, it was possible to control the table moving speed without any deterioration of the characteristic.

In the case of closed device 60a, no gaseous material was concentrated in the air accumulator 54 after the repetitive tests of 5000 times and 10000 times.

Figure 5:
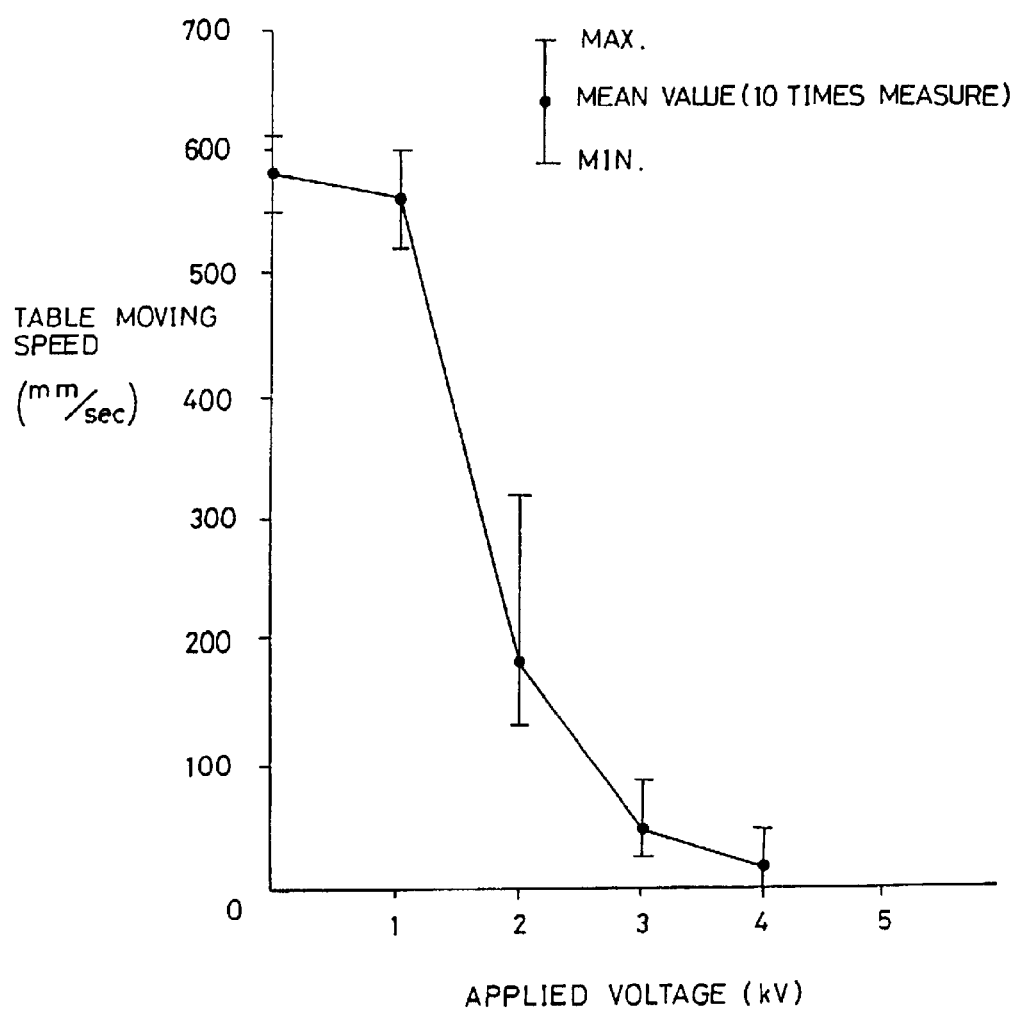
FIG. 5 is a graph showing the results measured when a repeatability test was carried out concerning the characteristic of the table moving speed of the closed device in accordance with the first embodiment.

Further, the repeatability test concerning the moving speed characteristics was carried out with respect to the foregoing closed device 60a. The measured results are shown in FIG. 5. As is clear from FIG. 5, in addition to the wide controllable speed range, the deviation of the measured speeds of the moving table for the applied voltages was very small and the control could be carried out with good repeatability.

(Second Embodiment)

The sealing of the electrorheological fluid 28B into the same closed device 60 as the first embodiment was carried out such that the electrorheological fluid 28B used as the non-compressive fluid 28 was injected into the container means of the closed device 60 under a reduced pressure of 600 torr and thereafter the injected electrorheological fluid 28B was deaerated for 3 hours under a reduced pressure of 20 torr and was sealed.

By use of the closed device 60b wherein the electrorheological fluid 28B was thus sealed, like the first embodiment, the test was carried out with regard to: (1) the applied voltage dependency of the table moving speed; and (2) the characteristics of the applied voltage dependency after repeated operations.

Figure 2:
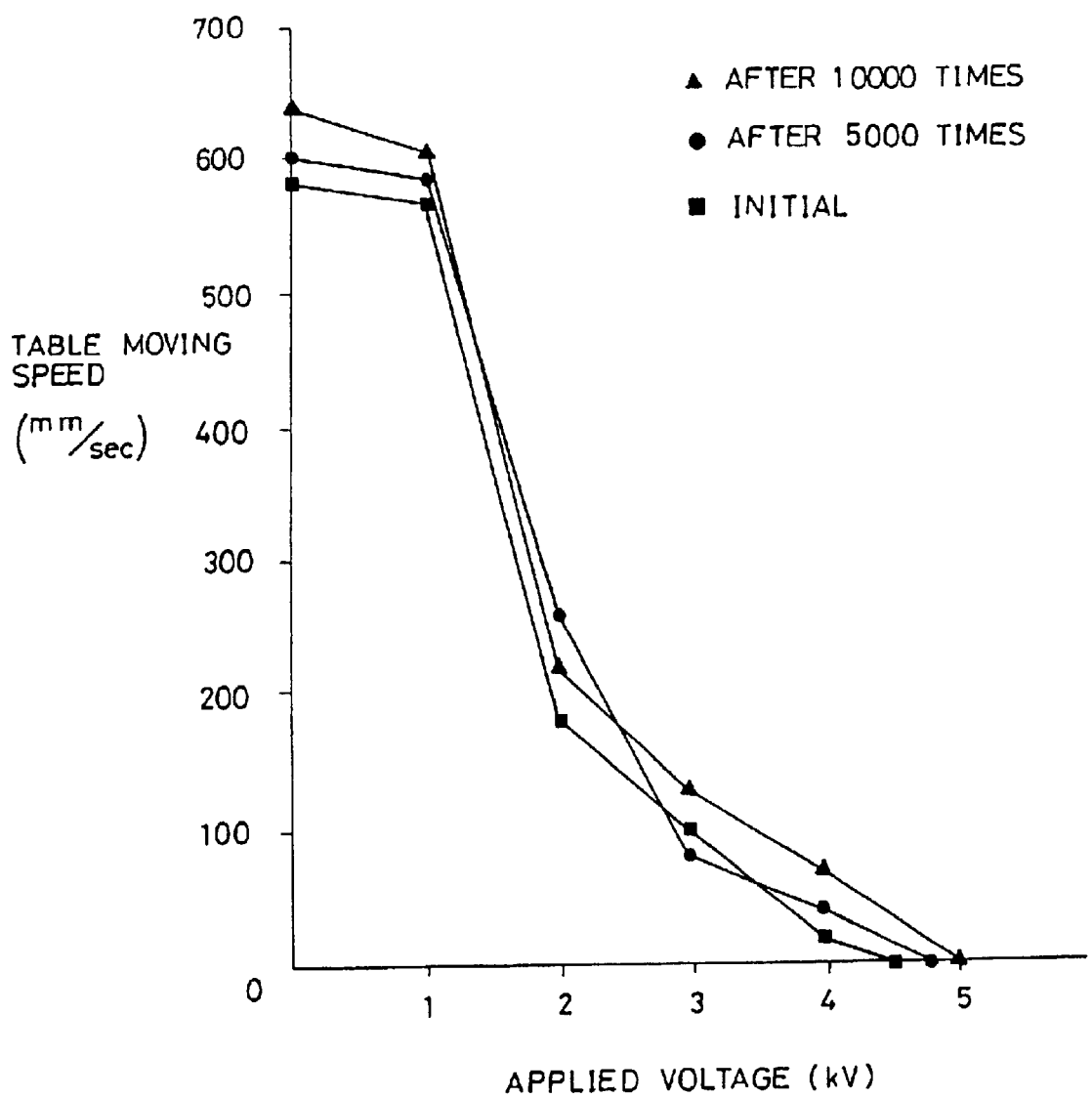
FIG. 2 is a graph showing the applied voltage dependency of the table moving speed of a closed device in accordance with a second embodiment of the present invention.

The measured results are shown in FIG. 2. As is clear from FIG. 2, it was possible to control the table moving speed in response to the applied voltage over a wide range like the first embodiment. Additionally, after the repetitive tests of 5000 times and 10000 times, it was possible to control the table moving speed without any deterioration of the characteristics.

In the case of closed device 60b, no gaseous material was concentrated in the air accumulator 54 after the repetitive tests of 5000 times and 10000 times.

(Third Embodiment)

The sealing of the electrorheological fluid 28C into the same closed device 60 as the first embodiment was carried out such that the electrorheological fluid 28C used as the non-compressive fluid 28 was injected into the container means of the closed device 60 under atmospheric pressure, thereafter the injected electrorheological fluid 28C was deaerated for 3 hours under a reduced pressure of 20 torr and was sealed.

By use of the closed device 60c wherein the electrorheological fluid 28C was thus sealed, like the first embodiment, the test was carried out with regard to: (1) the applied voltage dependency of the table moving speed; and (2) the characteristics of the applied voltage dependency after repeated operations.

Figure 3:
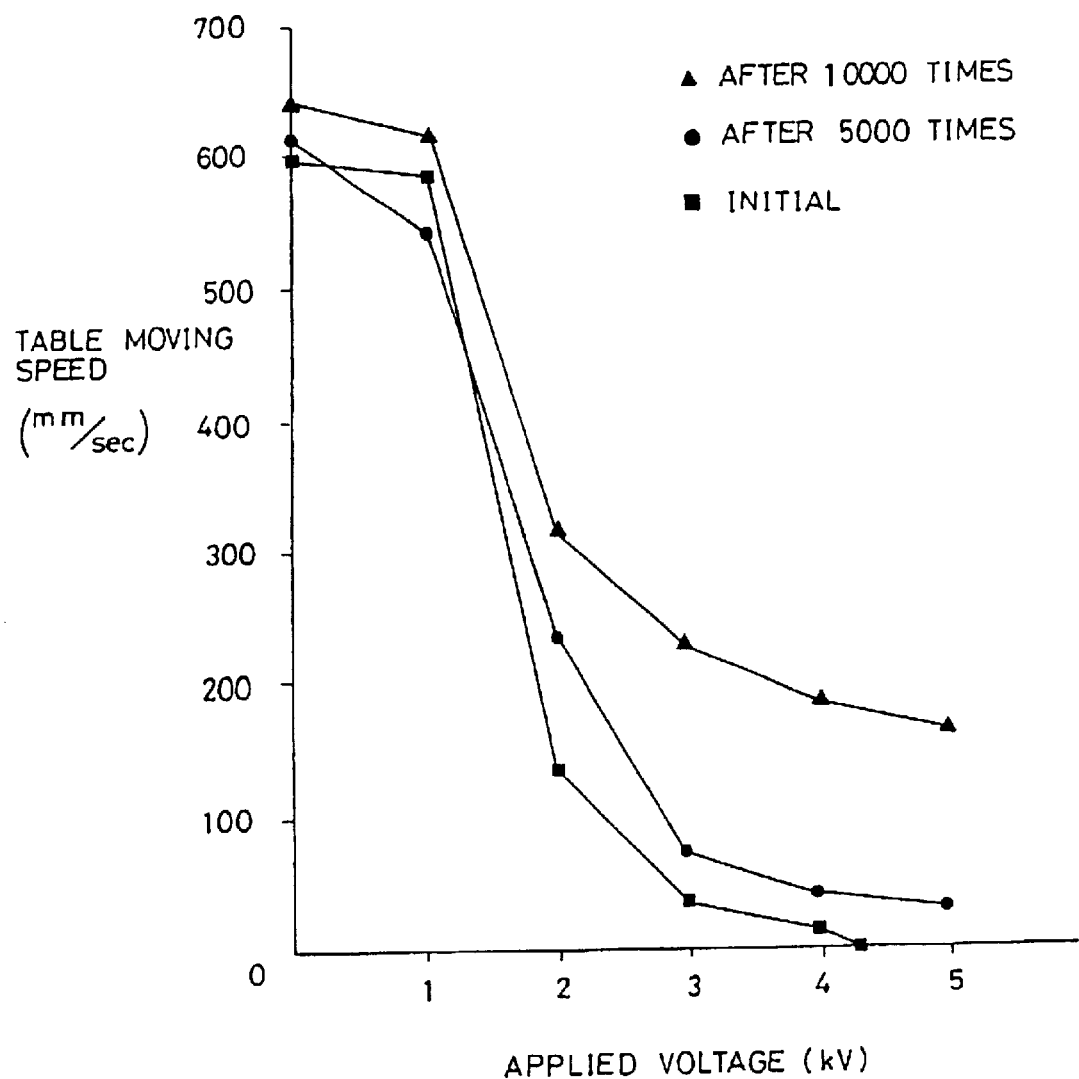
FIG. 3 is a graph showing the applied voltage dependency of the table moving speed of a closed device in accordance with a third embodiment of the present invention.

The measured results are shown in FIG. 3. As is clear from FIG. 3, it was possible to control the table moving speed in response to the applied voltage over a wide range like the first embodiment after the initial test and the repetitive tests of 5000 times. However, after the repetitive tests of 10000 times, it was possible to observe that the table moving speed was not controlled at fully slow speeds in a range of applied high voltages, thereby showing the characteristics deterioration.

In the case of closed device 60c, very little gaseous materials were concentrated in the air accumulator 54 after the repetitive tests of 5000 times. However, after the repetitive tests of 10000 times, a small amount of gaseous materials were concentrated in the air accumulator 54.

(Fourth Embodiment)

The sealing of the electrorheological fluid 28C into the same closed device 60 as the first embodiment was carried out such that the electrorheological fluid 28C which was prepared in the foregoing preparation example 3 as the non-compressive fluid 28 was injected into the container means of the closed device 60 under atmospheric pressure and thereafter the injected electrorheological fluid 28C was deaerated for 3 hours under a reduced pressure of 500 torr and was sealed.

By use of the closed device 60d wherein the electrorheological fluid 28C was thus sealed, like the first embodiment, the test was carried out with regard to: (1) the applied voltage dependency of the table moving speed; and (2) the characteristics of the applied voltage dependency after repeated operations.

Figure 4:
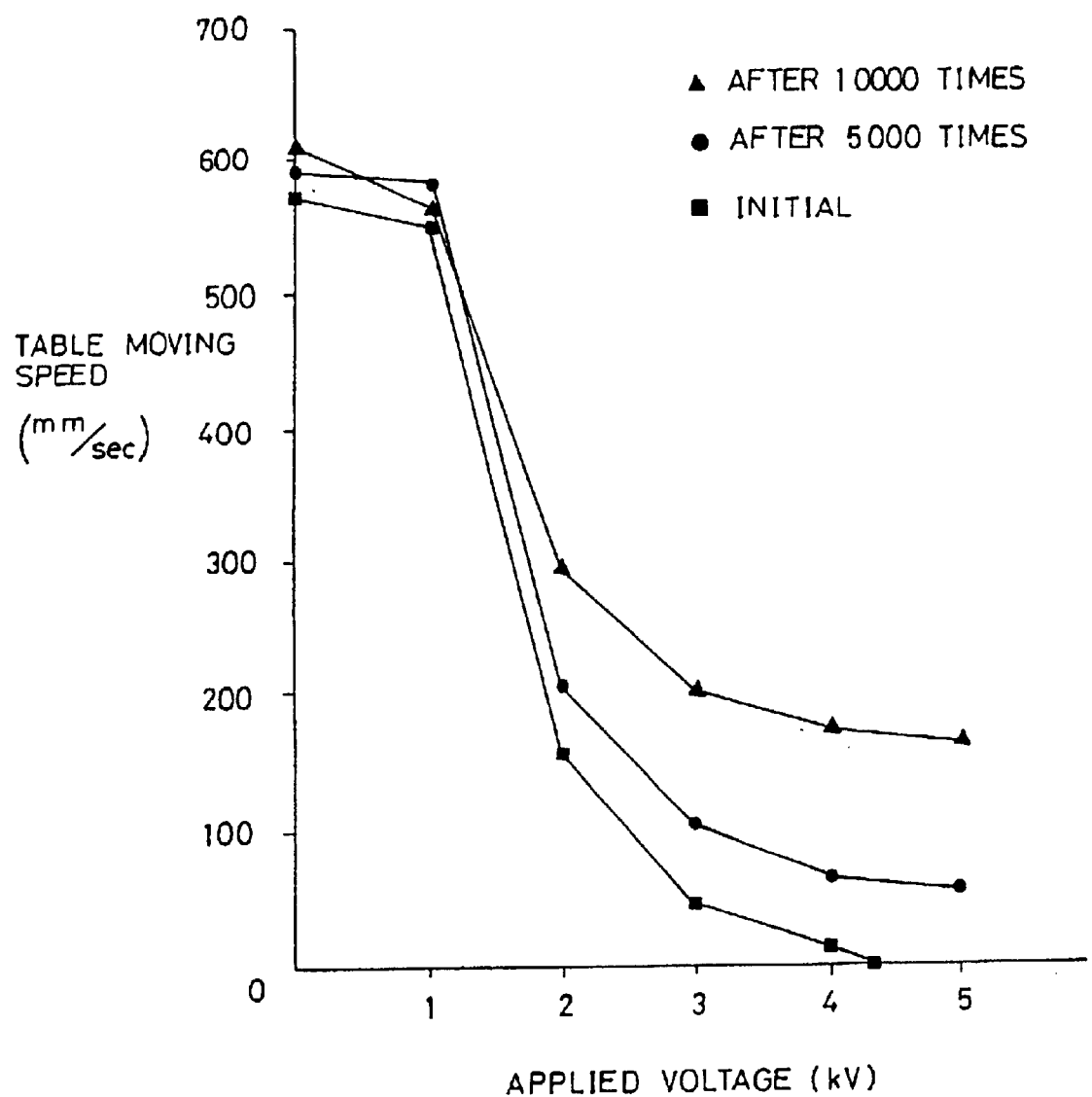
FIG. 4 is a graph showing the applied voltage dependency of the table moving speed of a closed device in accordance with a fourth embodiment of the present invention.

The measured results are shown in FIG. 4. As is clear from FIG. 4, it was possible to control the table moving speed in response to the applied voltage for only the initial test. However, during the repetitive tests of 10000 times, it was possible to observe that the more times the test was repeated, the worse the characteristics of the deterioration became.

In the case of closed device 60d, gaseous material was concentrated in the air accumulator 54 little by little in accordance with the increasing of the number of repetitive tests.

(Fifth Embodiment)

The sealing of the electrorheological fluid 28A into the same closed device 60 as the first embodiment was carried out such that the electrorheological fluid 28A which was prepared in the foregoing preparation example 1 as the non-compressive fluid 28 was injected into the container means of the closed device 60 under a reduced pressure of 100 torr and thereafter the injected electrorheological fluid 28A was deaerated for 3 hours at 50° C. under a reduced pressure of 5 torr and was sealed.

By use of the closed device 60e wherein the electrorheological fluid 28A was thus sealed, like the first embodiment, the test was carried out with regard to: (1) the applied voltage dependency of the table moving speed; and (2) the characteristics of the applied voltage dependency after repeated operations.

Figure 6:
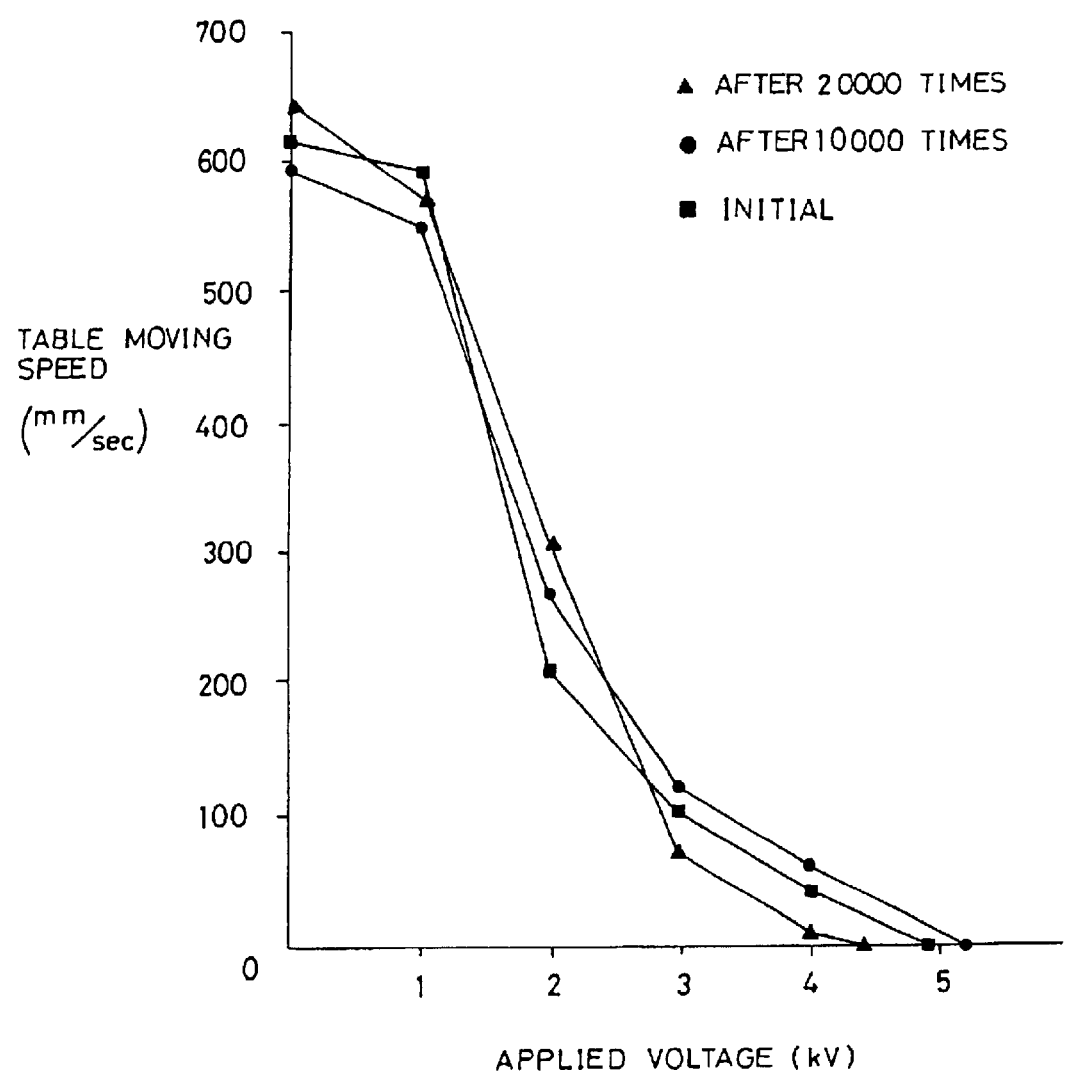
FIG. 6 is a graph showing the applied voltage dependency of the table moving speed of a closed device in accordance with a fifth embodiment of the present invention.

The measured results are shown in FIG. 6. As is clear from FIG. 6, it was possible to control the table moving speed in response to the applied voltage over a wide range like the first embodiment for the repetitive tests of the first 20000 times. Additionally, during the repetitive tests of 20000 times, it was possible to control the table moving speed without any deterioration of the characteristics.

In the case of closed device 60e, no gaseous material was concentrated in the air accumulator 54 during the repetitive tests of 20000 times.

(Sixth Embodiment)

The sealing of the electrorheological fluid 28A into the same closed device 60 as the first embodiment was carried out such that the electrorheological fluid 28A which was prepared in the foregoing preparation example 1 as the non-compressive fluid 28 was injected into the container means of the closed device 60 under a reduced pressure of 5 torr and was sealed.

By use of the closed device 60f wherein the electrorheological fluid 28A was thus sealed, like the first embodiment, the test was carried out with regard to: (1) the applied voltage dependency of the table moving speed; and (2) the characteristics of the applied voltage dependency after repeated operations.

Figure 7:
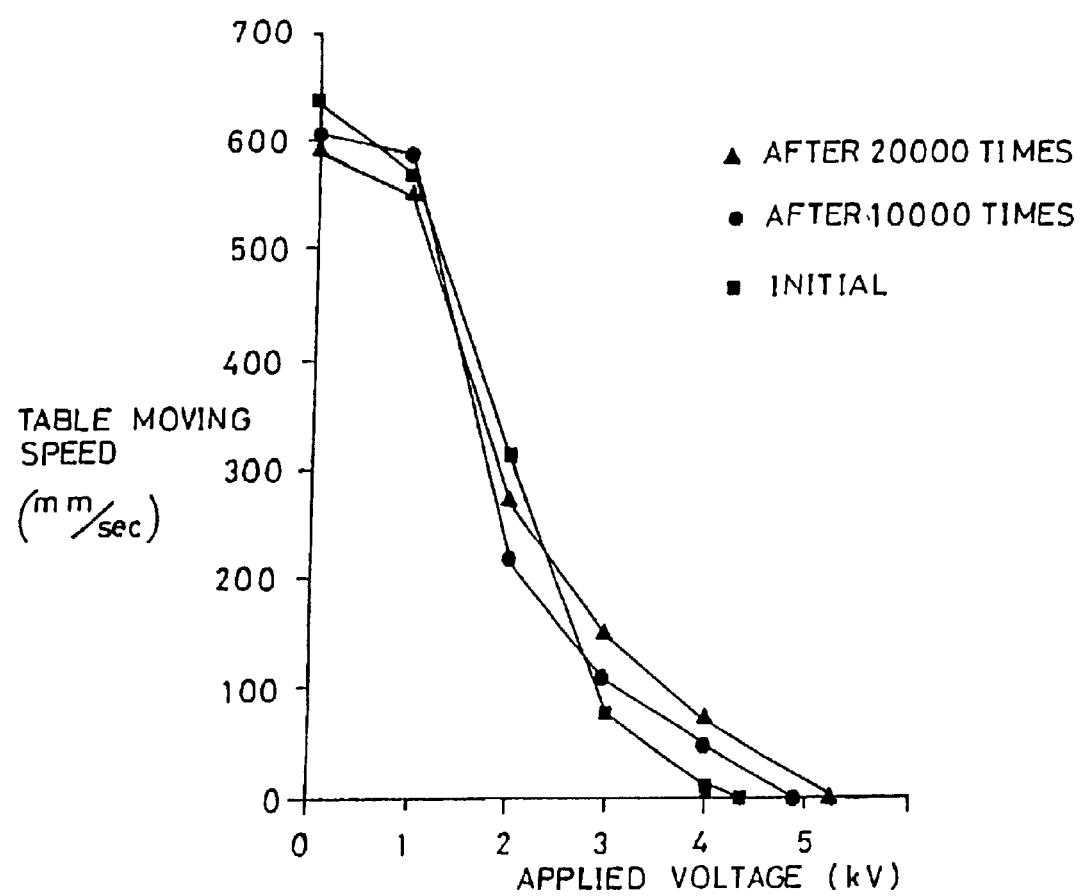
FIG. 7 is a graph showing the applied voltage dependency of the table moving speed of a closed device in accordance with a sixth embodiment of the present invention.

The measured results are shown in FIG. 7. As is clear from FIG. 7, it was possible to control the table moving speed in response to the applied voltage over a wide range like the first embodiment during the repetitive tests of 20000 times. Additionally, during the repetitive tests of 20000 times, it was possible to control the table moving speed without any deterioration of the characteristic.

In the case of closed device 60f, no gaseous material was concentrated in the air accumulator 54 during the repetitive tests of 20000 times.

(Seventh Embodiment)

The sealing of the electrorheological fluid 28E into the same closed device 60 as the first embodiment was carried out such that the electrorheological fluid 28E which was prepared in the foregoing preparation example 5 as the non-compressive fluid 28 was injected into the container means of the closed device 60 under a reduced pressure of 5 torr and was sealed.

By use of the closed device 60 g wherein the electrorheological fluid 28E was thus sealed, like the first embodiment, the test was carried out with regard to: (1) the applied voltage dependency of the table moving speed; and (2) the characteristics of the applied voltage dependency after repeated operations.

Figure 8:
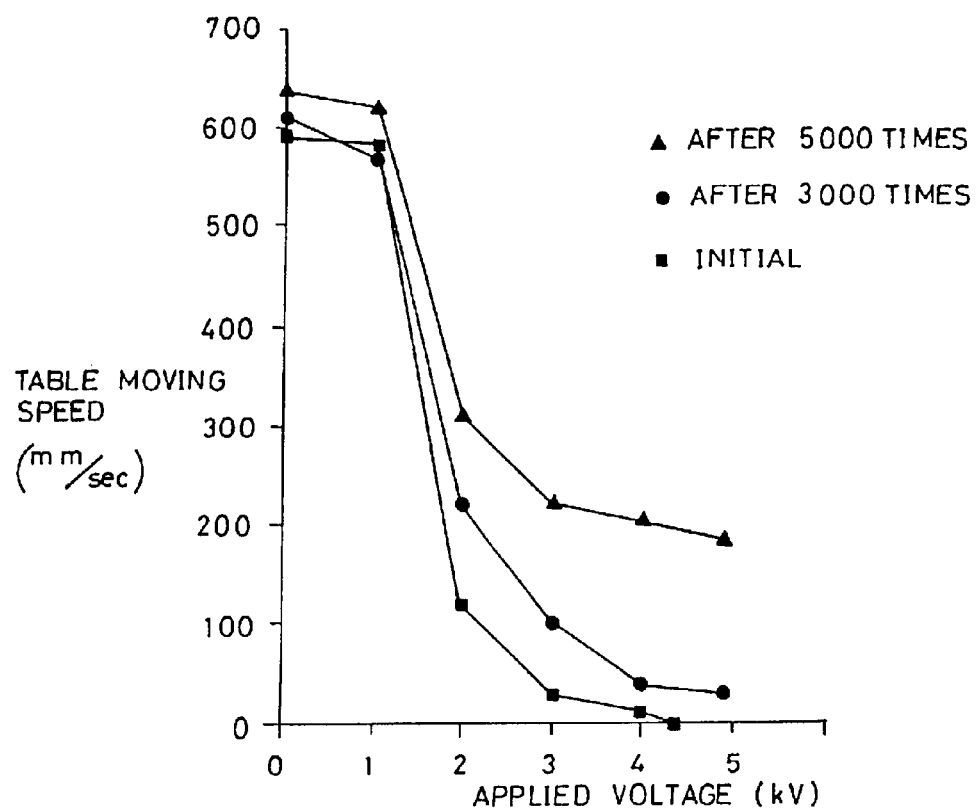
FIG. 8 is a graph showing the applied voltage dependency of the table moving speed of a closed device in accordance with a seventh embodiment of the present invention.

The measured results are shown in FIG. 8. As is clear from FIG. 8, it was possible to control the table moving speed in response to the applied voltage over a wide range like the first embodiment at the initial test and during the first repetitive tests of 3000 times. However, after the repetitive tests of 5000 times, it was possible to observe that the table moving speed was not controlled at fully slow speeds in a range of applied high voltages, thereby showing the deterioration of the characteristics.

In the case of closed device 60g, little gaseous material was concentrated in the air accumulator 54 after the repetitive tests of 3000 times, but a small amount of gaseous materials was concentrated in the air accumulator 54 after the repetitive tests of 5000 times.

(Eighth Embodiment)

The sealing of the electrorheological fluid 28E into the same closed device 60 as the first embodiment was carried out such that the electrorheological fluid 28E which was prepared in the foregoing preparation example 5 as the non-compressive fluid 28 was injected into the container means of the closed device 60 under a reduced pressure of 4 torr and thereafter the injected electrorheological fluid 28E was deaerated for 3 hours at 50° C. under a reduced pressure of 4 torr and was sealed.

By use of the closed device 60h wherein the electrorheological fluid 28E was thus sealed, like the first embodiment, the test was carried out with regard to: (1) the applied voltage dependency of the table moving speed; and (2) the characteristics of the applied voltage dependency after the repeated operations.

Figure 9:
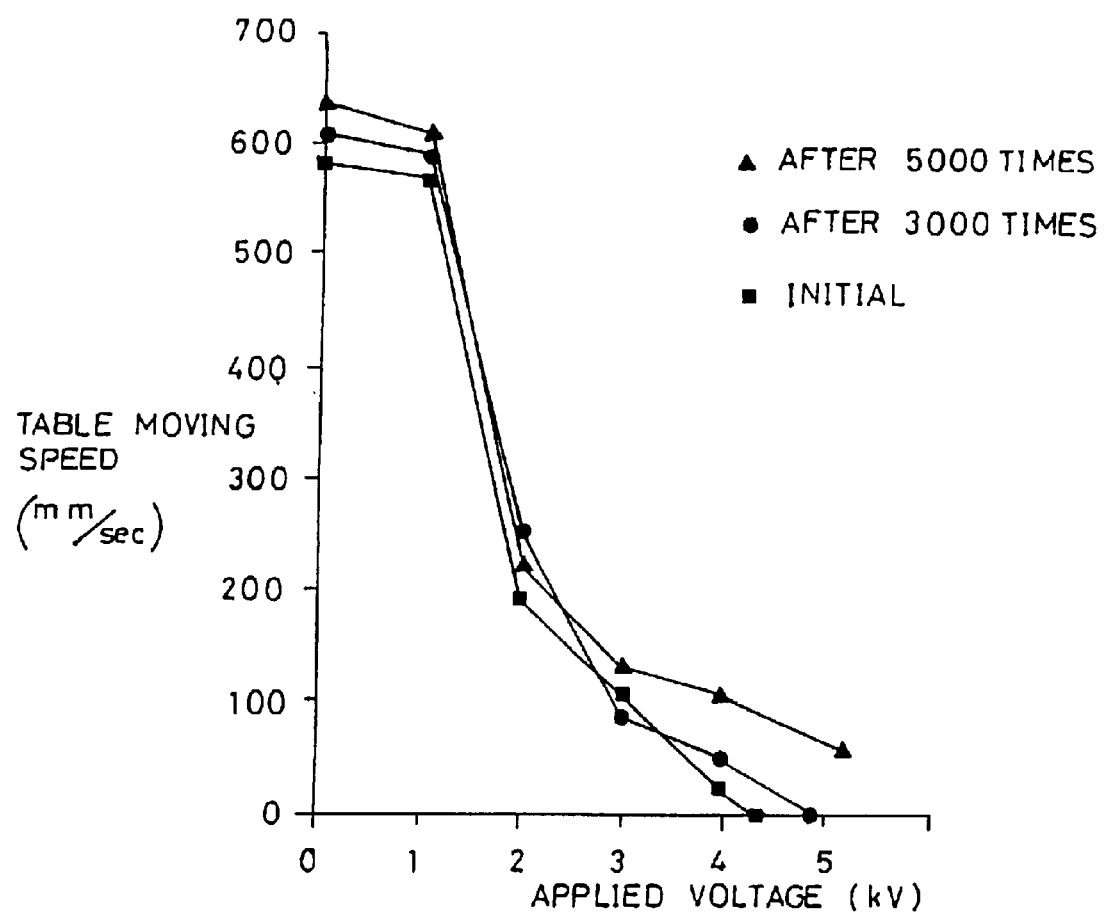
FIG. 9 is a graph showing the applied voltage dependency of the table moving speed of a closed device in accordance with an eighth embodiment of the present invention.

The measured results are shown in FIG. 9. As is clear from FIG. 9, it was possible to control the table moving speed in response to the applied voltage over a wide range like the first embodiment during the first repetitive tests of 5000 times. Additionally, during the repetitive tests of 5000 times, it was possible to control the table moving speed without any deterioration of the characteristics.

In the case of the closed device 60h, no gaseous material was concentrated in the air accumulator 54 during the repetitive tests of 5000 times.

COMPARATIVE EXAMPLE 1

The sealing of the electrorheological fluid 28C into the same closed device 60 as the first embodiment was carried out such that the electrorheological fluid 28C which was prepared in the foregoing third embodiment as the non-compressive fluid 28 was injected into the container means of the closed device 60 under atmospheric pressure and was sealed.

By use of the closed device 60i wherein the electrorheological fluid 28C was thus sealed, like the first embodiment, the test was carried out with regard to: (1) the applied voltage dependency of the table moving speed; and (2) the characteristics of the applied voltage dependency after the repeated operations.

According to the measured results with regard to the above-mentioned (1) and (2), poor control characteristics were obtained from the initial test and it was further possible to observe that the more times the test was repeated, the worse the characteristics of the deterioration became. More specifically, after the repetitive tests of only 100 times, dielectric breakdown occurred in the range of applied high voltages, thereby resulting in that the device could not operate any more.

Figure 10:
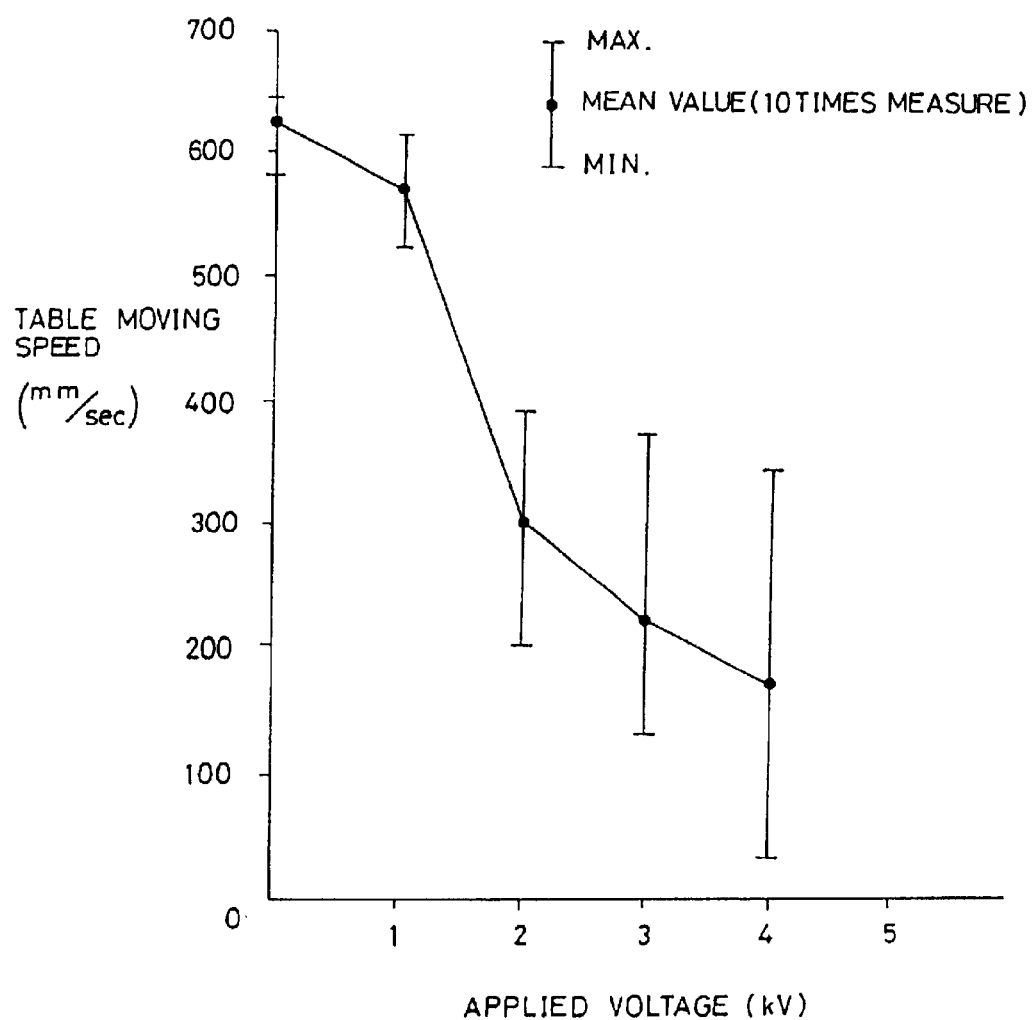
FIG. 10 is a graph showing the results measured when a repeatability test is carried out concerning the characteristic of the table moving speed of the closed device in accordance with a first comparative example.

Further, the repeatability test concerning the moving speed characteristics is shown in FIG. 10. As is clear from FIG. 10, when a high voltage was applied, the speed could not be controlled up to the speed range and the measured data greatly deviated, i.e., poor repeatability was obtained.

In the case of the closed device 60i, a large amount of gaseous materials was concentrated in the air accumulator 54 from the initial repetitive test.

COMPARATIVE EXAMPLE 2

The sealing of the electrorheological fluid 28D into the same closed device 60 as the first embodiment was carried out such that the electrorheological fluid 28D which was prepared in the foregoing preparation example 4 as the non-compressive fluid 28 was injected into the container means of the closed device 60 under atmospheric pressure and was sealed.

By use of the closed device 60j wherein the electrorheological fluid 28D was thus sealed, like the first embodiment, the test was carried out with regard to: (1) the applied voltage dependency of the table moving speed; and (2) the characteristics of the applied voltage dependency after the repeated operations.

According to the measured results with regard to the above-mentioned (1) and (2), poor control characteristics were obtained from the initial test and it was further possible to observe that the more times the test was repeated, the worse the characteristics of the deterioration became. More specifically, after the repetitive tests of only 150 times, dielectric breakdown occurred in a range of applied high voltages, thereby resulting in that the device could not operate any more.

In the case of the closed device 60j, a large amount of gaseous materials was concentrated in the air accumulator 54 from the initial repetitive test.

COMPARATIVE EXAMPLE 3

The sealing of the electrorheological fluid 28A into the same closed device 60 as the first embodiment was carried out such that the electrorheological fluid 28A which was prepared in the foregoing preparation example 1 as the non-compressive fluid 28 was injected into the container means of the closed device 60 under atmospheric pressure and was sealed.

By use of the closed device 60k wherein the electrorheological fluid 28A was thus sealed, like the first embodiment, the test was carried out with regard to: (1) the applied voltage dependency of the table moving speed; and (2) the characteristic of the applied voltage dependency after the repeated operations.

According to the measured results with regard to the above-mentioned (1) and (2), poor control characteristics were obtained from the initial test and it was further possible to observe that the more times the test was repeated, the worse the characteristics of the deterioration became. More specifically, after the repetitive tests of only 160 times, dielectric breakdown occurred in the range of applied high voltages, thereby resulting in that the device could not operate any more.

In the case of the closed device 60k, a large amount of gaseous materials was concentrated in the air accumulator 54 from the initial repetitive test.

According to the present invention, since the electrorheological fluid is deaerated in the closed device operated by the electrorheological fluid, it was surely possible to operate the closed device in accordance with the applied electric field and was further possible to operate the closed device without any irregular operations during the repetitive operations. Accordingly, it was possible to achieve a closed device which operates smoothly with repeatability.

There are described above novel features which the person skilled in the art will appreciate give rise to advantages. These are each independent aspects of the invention to be covered by the present application, irrespective of whether or not they are included within the scope of the following set of claims.

What is claimed is:

1. A method for deaerating electrorheological fluid in a closed device which is operated by the electrorheological fluid, comprising the steps of:

deaerating the electrorheological fluid during and/or after a time when the electrorheological fluid is injected into the closed device, the deaerating being carried out under a reduced pressure; and sealing the closed device after the deaerating.

2. The method as set forth in claim 1, further comprising the steps of:

deaerating the electrorheological fluid during and/or after a time when the electrorheological fluid is prepared by mixing dispersed phase particles with an insulating dispersion medium, the deaerating being carried out under reduced pressure; and injecting the electrorheological fluid into the closed device after the deaerating.

3. The method as set forth in claim 1, wherein the deaerating is carried out under a reduced pressure of not more than 100 torr.

4. The method as set forth in claim 1, wherein the deaerating is carried out under a reduced pressure of not more than 25 torr.

5. The method as set forth in claim 1, further comprising the step of heating the electrorheological fluid up to a predetermined temperature.

* * * * *